Oct. 6, 1931.  J. A. GILMAN  1,826,465
REEL FOR PLUMBBOBS
Filed March 30, 1928.
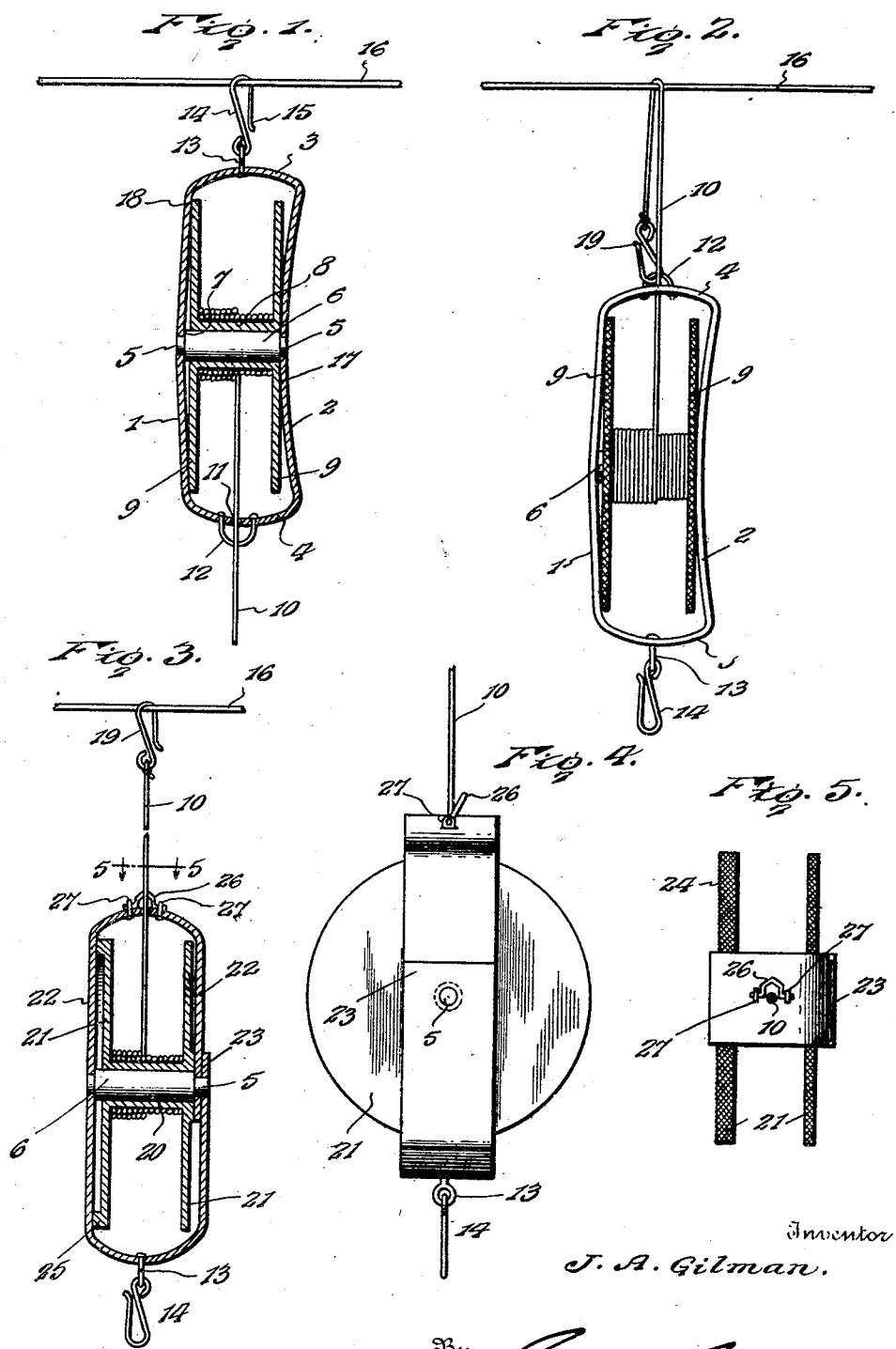

Patented Oct. 6, 1931

1,826,465

UNITED STATES PATENT OFFICE

JOHN A. GILMAN, OF SEATTLE, WASHINGTON

REEL FOR PLUMB BOBS

Application filed March 30, 1928. Serial No. 265,939.

This invention relates to plumb line reels and its object is to provide a small compact and light device of simple construction by the use of which the plumb line may be rapidly wound and may be easily and accurately adjusted. The invention also has for its object a construction whereby a plumb line, chalk line or other line constantly employed by mechanics may be easily released for use, automatically held in any position to which it may be adjusted and rapidly rewound when its use is not desired. Other objects will appear incidentally in the course of the following description, and the invention resides in certain novel features which are particularly pointed out in the appended claims.

In the accompanying drawings:

Figure 1 is a sectional view of a reel embodying the invention and showing one manner of using the same;

Fig. 2 is an elevation showing another manner of using the device;

Fig. 3 is a view similar to Fig. 1 but showing a different manner of using the device and a construction differing in some details from that shown in Fig. 1;

Fig. 4 is a side elevation of the structure shown in Fig. 3, and

Fig. 5 is a top plan view, with a part in section, on the line 5—5 of Fig. 3.

Referring more particularly to Figs. 1 and 2, there is shown a frame comprising side plates 1 and 2 connected at their ends by integral arched portions 3 and 4, the frame thus being in the form of an endless band or hoop and being constructed of some non-corrodible material having a spring temper. The side members 1 is convex while the side member 2 is concave and when the frame is produced, the concave side member follows an arc of somewhat shorter radius than that illustrated in the drawing. The opposite end members 3 and 4 are arched, as shown, so that they will clear the edges of the side plates of the reel and the side members are provided at their centers with openings adapted to receive the trunnions 5 at the ends of the pintle or axle 6, the trunnions being of less diameter than the body of the pintle so that annular shoulders, indicated at 7, will be provided.

The reel comprises a hub member 8 and side plates 9 in the form of circular disks, the side plates being preferably formed integral with the hub, as shown in Fig. 1. The plumb line 10 is attached to the hub of the reel in any approved manner so that it may wind thereon between the side plates and it passes from the hub through a central opening, indicated at 11, in the end member 4 of the frame. Adjacent the opening 11 and at opposite sides of the same other similar openings are provided in the end member 4 of the frame, and these openings receive the ends of a link 12 which in its simplest form is a loop of cord and may be utilized as a suspension means as will hereinafter appear. In the end member 3 of the frame, there is secured a link or eye 13 and a hook 14 is carried by said link. This hook is formed of spring wire which is properly treated to resist corrosion and the free end of the bill of the hook is so formed that it will normally lie in contact with or close to the shank of the hook, as indicated at 15, the extremity of the bill being turned outwardly from the shank so that a beveled or convex surface will be presented at either side to a building line 16 or other suspending device. By this construction, the hook may be easily engaged over a suspending element and just as easily removed therefrom but will be effectually held against accidental displacement. When the device is used as shown in Fig. 1, the plumb bob (not shown) is attached to the plumb line 10 but when the device is used as shown in Fig. 2, the plumb bob may be carried by the hook 14.

Owing to the curved formation of the sides of the frame, it will be readily noted that the concave side 2 bears against the adjacent side plate of the reel, as indicated at 17, while the convex side 1 of the frame bears against the periphery of the adjacent side plate of the reel, as indicated at 18, so that the sides of the frame serve as brakes to resist rotation of the reel and thereby hold it in any position to which it may be brought in use. When it is desired to use the device, the frame is grasped by the operator with the thumb pressing against the side plate 1 at the center thereof and the fingers of the user's hand pressing against the end portions of the side plate 2 so that the pressure will tend to straighten the sides of the frame and release the braking action exerted by the sides of the frame so that the reel will be free to rotate. When the surface to be tested is of short vertical extent, one mechanic may use the device and in such event the hook 14 is engaged over the building or construction line, as shown in Fig. 1, and the plumb line is allowed to unwind under the gravitating influence of the bob until the line has run out to the proper extent. If the pressure upon the sides of the frame be then relieved, the reel will be arrested and will be held in the position reached by it. Should the structure to be tested be of considerable height, as, for instance, when it extends across more than one story of a building under construction, it may be necessary for one operator to control the unwinding of the plumb line so that he may stop the same when notified by a co-worker in a lower story.

It is sometimes necessary for the line 16 to be located at such a height above the workman that it cannot be easily reached by him for the purpose of engaging the hook 14 thereover. Under these conditions, it is now the practice to throw the end of the plumb line over the construction line or element and then tie the end of the plumb line to the intervening length of the same, but this practice is obviously inconvenient and time-consuming. With my device, the end of the plumb line is thrown over the construction element, as shown in Fig. 2, but the hook 19 at the end of the line, which ordinarily carries the plumb bob, is engaged in the link 12, as shown in Fig. 2, after which the reel may be permitted to unwind and descend with the bob which, in this instance, is suspended on the hook 14. This feature of my device is advantageous in use inasmuch as the hook 19 may be very easily and quickly engaged with the link 12 and saves time both in setting the reel in position for use and detaching it when the necessity for its use has passed. In Fig. 3, I have shown the hook 19 as engaged directly over the element 16 and this method of using the device is, of course, practical when said element is within easy reach.

It will be understood, of course, that the side plates of the frame and reel shown at the left side of Figs. 1 and 2 may be relatively reversed, that is, the side of the reel may be curved and the side of the plates straight while the right side of the device remains as illustrated, and this arrangement will operate in the same manner as that described, the braking action being released by pressure of the thumb on the left end of the pintle and of the fingers on the marginal portions of the right side of the frame. The form of the invention illustrated in Figs. 1 and 2 is practical and is satisfactory for small comparatively light reels and bobs. When the bob is heavy and a larger or heavier reel is desired, I may employ the construction shown in Figs. 3, 4 and 5. The pintle 6 with its trunnions 5 may be identical with the pintle shown in Figs. 1 and 2 and previously described. The reel consists of a hub 20 and side disks 21 but the frame, instead of having convex and concave sides, as in the first described form has parallel straight sides, as shown at 22, and instead of being a single integral hoop, as previously described, it may be formed from a flat strap having its ends brought into overlapping relation, as shown at 23, and welded or otherwise firmly secured together. The same hook 14 is employed and suspended in the same manner as in the first described form, and in both forms of the device the peripheries of the side plates of the reel are knurled or otherwise roughened, as shown in Figs. 2 and 5, whereby they may effect frictional engagement with a surface upon which they may be rolled. In this embodiment of the invention, the braking action may be increased by providing the inner surface of one side member of the frame or a side of the reel or both with a knurled or roughened surface, as indicated on the left side of Fig. 5 and this roughened surface may advantageously take the form of radially disposed corrugations or slight ribs. To reinforce the side plate of the reel and provide longitudinal clearance between the hub of the reel and the side of the frame, an annular flange or rim 25 may be formed thereon and the corrugated or roughened surface may be provided upon the outer side of this rim. The knurled surfaces will have yieldable or resilient engagement but will have sufficient intermeshing force to support heavy bobs but will yield readily under pressure from the fingers of the user.

The release of the braking action is accomplished in exactly the same manner as previously described, by pressure of the thumb upon the left end of the pintle and pressure of the fingers upon the end portions of the right side of the frame, and the reel may be entirely released to rotate freely for winding or unwinding the line.

It will be observed that the rim or flange 25 provides longitudinal clearance between the frame and the hub of the reel and that this clearance has the same function as the clearance shown in Figs. 1 and 2. It is evidently immaterial whether the left side of the frame is curved or straight as long as there is clearance between the hub of the reel and the frame on one side and between the periphery of the reel and the margin of the frame on the other side so that the frame may be cramped to the left to release the braking effect caused by the tendency of the frame to cramp longitudinally upon the reel. It will be seen also that whether the curved element is the side of the frame or the side of the reel, the same operative effect is obtained in the braking contact at the periphery of the reel and the same clearance for release manipulation remain at the hub on one side and at the periphery on the other side.

In Figs. 3, 4 and 5, instead of the loop 12 having its ends secured directly in the end of the frame, I have shown a link in the form of a metal bail 26 having its ends rockingly engaged and held in eyes 27 secured in the end of the frame at opposite sides of the opening through which the plumb line 10 passes. This bail or link will be clear of the thumb line when not in use but will swing up close to the line when in use as a suspension means so that the center of gravity common to the line and the link will coincide with the original gravitational center of the line.

In use, the plumb line may be unwound to any desired extent and when it has been so unwound the pressure exerted upon the sides of the frame will be released so that the desired braking engagement between the frame and the reel will at once occur and the plumb line and reel will be effectually held in the position in which they have been set. To rewind the line, the device is removed from the element upon which it was hung and the line then held under light tension by one hand of the user while the with other hand he rolls the reel along any convenient surface, the frictional engagement between the peripheries of the reel side plates and said surface causing a rotation of the reel which will quickly wind the line.

In assembling the device, the reel is placed upon the pintle and the sides of the frame then forced apart sufficiently to permit the ends of the pintle to be engaged between the same, whereupon slight pressure exerted upon the pintle will serve to bring the ends thereof into alinement with the openings in the sides of the frame and permit the latter to spring over the trunnions and complete the assembling. The annular shoulder 7 at the ends of the pintle will hold the sides of the frame apart sufficiently to permit free rotation of the reel when the braking engagement between the frame and the reel has been relieved.

It will be readily seen from the foregoing description, taken in connection with the accompanying drawings, that I have provided an exceedingly simple, compact and light device which may be produced at a very low cost and will prove highly efficient in use. It will be especially noted that there are no cranks, housings, springs and other features of construction which, in prior devices, have made the cost of the same high so that mechanics would not adopt and use the devices. It will be observed that I have provided three means of suspending the device, the plumb line being one means of suspension, the link 12 or 26 being a second means, and the hook 14 being a third means. It is evident that the gravitational or static center of the link coincides with the static center of the line, and if the device should spin, as sometimes happens, due to the line being twisted, the dynamic centers of the link and the line will also coincide. It is also evident that the link or the line or both constitute a suspension means at one extremity of the gravitational axis of the device and the hook 14 is a suspension means at the opposite extremity of said gravitational axis, and that, by whatever means the device be suspended, the dynamic axis or static center does not change.

Having thus described the invention, I claim:

1. A device for the purpose set forth comprising a frame having resilient sides, a pintle fitted in the sides of the frame at the centers thereof and constructed to maintain the spaced relation thereof, and a reel mounted upon said pintle and having one side normally frictionally engaged by the adjacent side of the frame and releasable therefrom by finger pressure.

2. A device for the purpose set forth comprising a reel, a frame in which the reel is mounted and which is provided with a line guide opening in one end, and suspension links at both ends of the frame, one of the links having its ends attached to the frame adjacent and at opposite sides of said line guide opening and said opening and the links being located on the line of gravitation of the frame and reel.

3. A device for the purpose set forth comprising a reel, and a frame in which the reel is mounted, there being clearance between the frame and the hub of the reel only at one side and clearance between the frame and the periphery of the reel only at the opposite side whereby the frame at the first-mentioned side normally has braking engagement with the periphery of the reel.

4. A device for the purpose set forth comprising a reel, and a resilient frame in which the reel is mounted, the resiliency of the frame causing one side thereof adjacent its opposite ends to normally bind against the margin of the reel.

5. A device for the purpose set forth comprising a reel, and a resilient frame in which the reel is mounted and which normally is free of the periphery of the reel at one side and is in braking engagement with the periphery of the reel at the opposite side whereby pressure exerted upon the frame at its ends on one side and at its center on the opposite side will release the reel.

In testimony whereof I affix my signature.

JOHN A. GILMAN. [L. S.]